United States Patent
Machita et al.

(10) Patent No.: US 7,551,407 B2
(45) Date of Patent: Jun. 23, 2009

(54) THIN-FILM MAGNETIC HEAD, HEAD GIMBAL ASSEMBLY AND HARD DISK DRIVE

(75) Inventors: Takahiko Machita, Tokyo (JP); Koji Shimazawa, Tokyo (JP)

(73) Assignee: TDK Corporation, Tokyo (JP)

( * ) Notice: Subject to any disclaimer, the term of this patent is extended or adjusted under 35 U.S.C. 154(b) by 472 days.

(21) Appl. No.: 11/073,385

(22) Filed: Mar. 7, 2005

(65) Prior Publication Data

US 2005/0213261 A1 Sep. 29, 2005

(30) Foreign Application Priority Data

Mar. 26, 2004 (JP) .............................. 2004-092942

(51) Int. Cl.
*G11B 5/39* (2006.01)
*G11B 5/127* (2006.01)
(52) U.S. Cl. .................................. 360/320; 360/125.32
(58) Field of Classification Search ................ 360/125, 360/319, 320, 324, 125.32
See application file for complete search history.

(56) References Cited

U.S. PATENT DOCUMENTS

| | | | |
|---|---|---|---|
| 5,880,911 A * | 3/1999 | Ishihara et al. | 360/324 |
| 6,101,072 A * | 8/2000 | Hayashi | 360/324 |
| 6,153,319 A | 11/2000 | Hasegawa | |
| 6,661,605 B1 * | 12/2003 | Pust et al. | 360/126 |
| 6,747,841 B1 * | 6/2004 | Olim et al. | 360/125.39 |
| 6,775,108 B2 * | 8/2004 | Kief et al. | 360/319 |
| 6,819,526 B2 * | 11/2004 | Kataoka et al. | 360/97.01 |
| 2002/0191326 A1 * | 12/2002 | Xu et al. | 360/75 |
| 2003/0081359 A1 * | 5/2003 | Pust et al. | 360/319 |
| 2003/0086215 A1 * | 5/2003 | Kief et al. | 360/319 |
| 2004/0008451 A1 * | 1/2004 | Zou et al. | 360/317 |
| 2004/0252412 A1 * | 12/2004 | Pendray et al. | 360/234.7 |

FOREIGN PATENT DOCUMENTS

| JP | A 11-97763 | 4/1999 |
|---|---|---|
| JP | A 2002-100011 | 4/2002 |

* cited by examiner

*Primary Examiner*—Brian E Miller
*Assistant Examiner*—Adam B Dravininkas
(74) *Attorney, Agent, or Firm*—Oliff & Berridge, PLC

(57) ABSTRACT

A read head comprises: a bottom shield layer; a top shield layer; an MR element disposed between the bottom shield layer and the top shield layer; a bottom shield gap film disposed between the bottom shield layer and the MR element; and a top shield gap film disposed between the top shield layer and the MR element. The MR element has a first end closer to the air bearing surface and a second end opposite to the first end. An adjacent layer made of a metal material is adjacent to the second end with an insulating film disposed in between. The material making up the adjacent layer has a linear thermal expansion coefficient whose absolute value is $6 \times 10^{-6}/°C$ or smaller at a temperature of 30° C., and preferably $1 \times 10^{-6}/°C$ or smaller.

6 Claims, 13 Drawing Sheets

THIN-FILM MAGNETIC HEAD, HEAD GIMBAL ASSEMBLY AND HARD DISK DRIVE

BACKGROUND OF THE INVENTION

1. Field of the Invention

The present invention relates to a thin-film magnetic head comprising a magnetoresistive element, and to a head gimbal assembly and a hard disk drive each incorporating the thin-film magnetic head.

2. Description of the Related Art

Performance improvements in thin-film magnetic heads have been sought as areal recording density of hard disk drives has increased. A widely used type of thin-film magnetic head is a composite thin-film magnetic head that has a layered structure in which a write (recording) head having an induction-type electromagnetic transducer for writing and a read (reproducing) head having a magnetoresistive (MR) element for reading are stacked on a substrate.

MR elements include: anisotropic magnetoresistive (AMR) elements utilizing an anisotropic magnetoresistive effect; giant magnetoresistive (GMR) elements utilizing a giant magnetoresistive effect; and tunnel magnetoresistive (TMR) elements utilizing a tunnel magnetoresistive effect. It is required that the characteristics of a read head include high sensitivity and high output capability. GMR heads incorporating spin-valve GMR elements have been mass-produced as read heads that satisfy such requirements.

A typical spin-valve GMR element incorporates: a nonmagnetic conductive layer having two surfaces facing toward opposite directions; a free layer disposed adjacent to one of the surfaces of the nonmagnetic conductive layer; a pinned layer disposed adjacent to the other of the surfaces of the nonmagnetic conductive layer; and an antiferromagnetic layer disposed adjacent to one of the surfaces of the pinned layer farther from the nonmagnetic conductive layer. The free layer is a layer in which the direction of magnetization changes in response to a signal magnetic field. The pinned layer is a ferromagnetic layer in which the direction of magnetization is fixed. The antiferromagnetic layer is a layer that fixes the direction of magnetization in the pinned layer by means of exchange coupling with the pinned layer. Such a GMR element is disclosed in the Published Unexamined Japanese Patent Application Heisei 11-97763 (1999), for example.

In a GMR head, typically, the GMR element is located between two shield layers disposed on top and bottom thereof. An insulating film is provided between the GMR element and each of the shield layers. Bias field applying layers are disposed on both sides of the GMR element that are opposed to each other in the direction of the track width. The bias field applying layers apply a bias magnetic field to the free layer. Such a GMR head is disclosed in the Published Unexamined Japanese Patent Application 2002-100011, for example.

The bias magnetic field generated by the bias field applying layers directs the magnetization in the free layer to the direction of track width while no signal magnetic field sent from the recording medium is applied to the free layer. The magnetization in the pinned layer is fixed to the direction orthogonal to a medium facing surface of the head that faces toward the recording medium. Consequently, an angle of 90 degrees is maintained between the direction of magnetization in the pinned layer and the direction of magnetization in the free layer while no signal magnetic field sent from the recording medium is applied to the free layer. If a signal magnetic field in the direction orthogonal to the medium facing surface is sent from the recording medium and applied to the GMR head, the direction of magnetization in the free layer is changed, and the angle between the direction of magnetization in the pinned layer and the direction of magnetization in the free layer is thereby changed. The electrical resistance of the GMR element is changed by this angle. Therefore, it is possible to read data stored on the medium by detecting the change in electrical resistance of the GMR element.

Many of GMR heads have a structure in which a top shield layer is adjacent to an end of the GMR element opposite to the medium facing surface, an insulating film being provided between the top shield layer and the end of the GMR element. The top shield layer is made of a material such as NiFe (80 weight % Ni and 20 weight % Fe). This NiFe (80 weight % Ni and 20 weight % Fe) has a linear thermal expansion coefficient of about $12 \times 10^{-6}/°$ C. at a temperature of 30° C. When a thin-film magnetic head incorporating the GMR head is actually operated, the temperature of the GMR head goes up to a hundred and several tens of degrees centigrade. As a result, when the thin-film magnetic head is actually operated, the top shield layer expands, and a force pressing toward the medium facing surface is thereby applied to the GMR element. Typically, there is hardly a case in which the magnetic material used for the free layer of the GMR element has a magnetostriction constant of zero, but the material has a magnetostriction constant of a specific positive or negative value. Therefore, a magnetic anisotropy is created in the free layer by the inverse magnetostrictive effect when the force pressing toward the medium facing surface is applied to the GMR element by the expansion of the top shield layer when the thin-film magnetic head is actually operated, as described above. The magnetic anisotropy created in the free layer functions such that the magnetization in the free layer is directed to the direction of track width or the direction orthogonal to the medium facing surface, depending on whether the magnetostriction constant of the magnetic material of the free layer is of a positive value or a negative value.

The asymmetry of the output of the head changes when the magnetic anisotropy resulting from the inverse magnetostrictive effect is created in the free layer as described above. The asymmetry of the output of the head means the asymmetry between two types of output waveforms of the head: one of the two types is a waveform obtained when a magnetic field of +H is applied to the head in the direction orthogonal to the medium facing surface; and the other of the two types is a waveform obtained when a magnetic field of −H is applied to the head in the direction orthogonal to the medium facing surface. To be specific, the asymmetry of the output of the head is expressed by the equation below where the amounts of change in resistance obtained when magnetic fields of +H and −H are applied to the head are indicated by $\Delta R(+H)$ and $\Delta R(-H)$, respectively.

$$R(+H)+\Delta R(-H)\}(\%)$$

Even though a number of thin-film magnetic heads having the same specifications are manufactured, there are variations among the heads in the force applied to each GMR element by the expansion of the top shield layer during actual use. Therefore, conventional heads have a problem that variations in asymmetry of the outputs of the heads during actual use increase, because of the expansion of the top shield layer.

As disclosed in the Published Unexamined Japanese Patent Application Heisei 11-97763, it is known that tensile stress in the direction orthogonal to the medium facing surface exists as internal stress in the GMR element in the GMR head. This publication discloses a technique in which the value of magnetostriction constant of the free layer is made $-2\times10^{-6}$ to 0 for preventing a deterioration of the asymmetry resulting from the tensile stress.

However, this technique is not capable of preventing an increase in variations in asymmetry resulting from the expansion of the top shield layer as described above when the value of the magnetostriction constant of the free layer is smaller than zero. In addition, the technique has a problem that limitation is imposed on selection of the magnetic material used for the free layer when the value of the magnetostriction constant of the free layer is zero.

The Published Unexamined Japanese Patent Application 2002-100011 discloses a technique in which a rear insulating film is provided to be adjacent to an end of the MR element opposite to the medium facing surface, and the rear insulating film is made of an insulating material having a thermal conductivity higher than that of the insulating film provided between the MR element and each of the shield layers. According to this technique, it is possible to suppress a rise in temperature of the MR element. However, the technique has the following problem since the rear insulating film is disposed on the side of the MR element opposite to the MR element, the rear insulating film being made of a hard inorganic insulating material and having a large volume. When the medium facing surface is polished during the manufacturing process of the thin-film magnetic head, stress is applied to the MR element. If the rear insulating film that is hard and has a large volume is disposed on the side of the MR element opposite to the medium facing surface, the stress applied to the MR element during polishing of the medium facing surface increases, and the direction of magnetization in the pinned layer may be thereby changed.

The foregoing problems are not limited to the case in which the MR element is a spin-valve GMR element but applicable to thin-film magnetic heads in general incorporating various types of MR elements.

OBJECT AND SUMMARY OF THE INVENTION

It is an object of the invention to provide a thin-film magnetic head incorporating a magnetoresistive element and capable of reducing variations in asymmetry of output, and to provide a head gimbal assembly and a hard disk drive each incorporating the thin-film magnetic head.

A thin-film magnetic head of the invention comprises: a medium facing surface that faces toward a recording medium; and a magnetoresistive element disposed near the medium facing surface. The magnetoresistive element has a first end closer to the medium facing surface and a second end opposite to the first end. The thin-film magnetic head further comprises: an insulating film disposed adjacent to the second end; and an adjacent layer disposed adjacent to the second end with the insulating film disposed in between, the adjacent layer being made of a metal material having a linear thermal expansion coefficient whose absolute value is $6\times10^{-6}/^{\circ}$ C. or smaller at a temperature of 30° C.

In the thin-film magnetic head of the invention, the adjacent layer having a linear thermal expansion coefficient whose absolute value is small is adjacent to the second end of the magnetoresistive element with the insulating film disposed in between. As a result, according to the invention, a force applied to the magnetoresistive element in response to changes in temperature is reduced, and changes in asymmetry of the output are reduced, too.

In the thin-film magnetic head of the invention, the metal material making up the adjacent layer may have a linear thermal expansion coefficient whose absolute value is $1\times10^{-6}/^{\circ}$ C. or smaller at a temperature of 30° C.

In the thin-film magnetic head of the invention, the metal material making up the adjacent layer may contain any of an iron-nickel alloy, an iron-platinum alloy, an iron-palladium alloy, an iron-cobalt-nickel alloy, an iron-cobalt-chromium alloy, an iron-nickel-chromium alloy, an iron-nickel-manganese alloy, and an antiferromagnetic chromium-iron-manganese alloy.

A head gimbal assembly of the invention comprises: a slider incorporating the thin-film magnetic head of the invention and disposed to face toward a recording medium; and a suspension flexibly supporting the slider.

A hard disk drive of the invention comprises: a slider incorporating the thin-film magnetic head of the invention and disposed to face toward a circular-plate-shaped recording medium that is rotated and driven; and an alignment device supporting the slider and aligning the slider with respect to the recording medium.

According to the invention, the adjacent layer having a linear thermal expansion coefficient whose absolute value is small is adjacent to the second end of the magnetoresistive element with the insulating film disposed in between. As a result, a force applied to the magnetoresistive element in response to changes in temperature is reduced, and changes in asymmetry of the output are reduced, too. It is thereby possible to reduce variations in asymmetry of the output.

Other and further objects, features and advantages of the invention will appear more fully from the following description.

DETAILED DESCRIPTION OF THE PREFERRED EMBODIMENT

Figure 4:
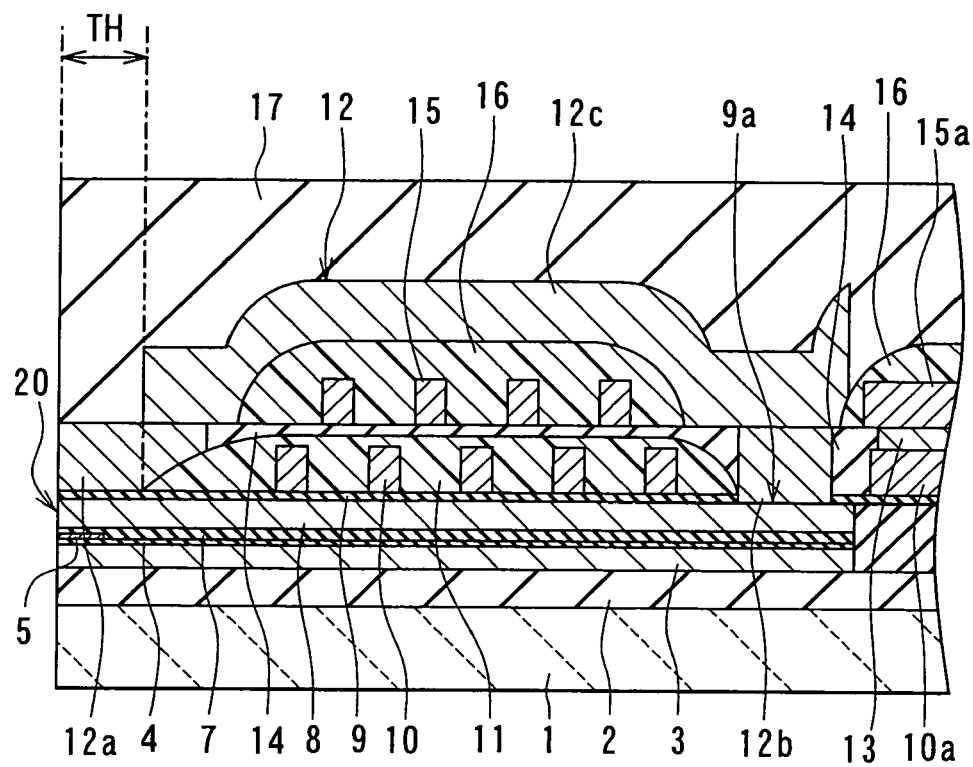
FIG. 4 is a cross-sectional view of a thin-film magnetic head of the embodiment of the invention, wherein the cross section is orthogonal to the air bearing surface and the substrate.
Figure 5:
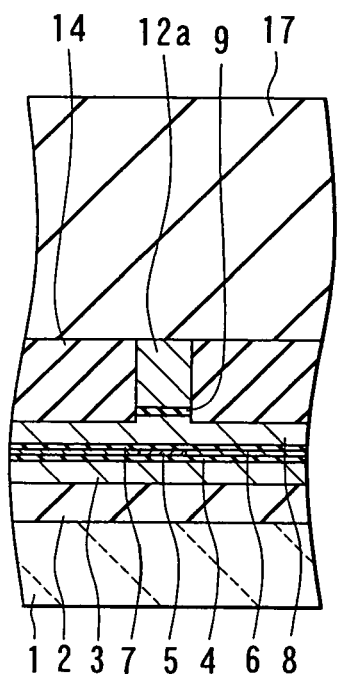
FIG. 5 is a cross-sectional view of a pole portion of the thin-film magnetic head of the embodiment of the invention, wherein the cross section is parallel to the air bearing surface.

A preferred embodiment of the invention will now be described in detail with reference to the accompanying drawings. Reference is now made to FIG. 4 and FIG. 5 to describe the outlines of the configuration and a manufacturing method of a thin-film magnetic head of an embodiment of the invention. FIG. 4 illustrates a cross section of the thin-film magnetic head orthogonal to the air bearing surface and a substrate. FIG. 5 illustrates a cross section of a pole portion of the thin-film magnetic head parallel to the air bearing surface.

In the method of manufacturing the thin-film magnetic head of the embodiment, first, an insulating layer 2 made of an insulating material such as alumina ($Al_2O_3$) and having a thickness of 1 to 5 μm, for example, is formed by a method such as sputtering on a substrate 1 made of a ceramic such as aluminum oxide and titanium carbide ($Al_2O_3$—TiC). Next, a bottom shield layer 3 for a read head made of a magnetic material such as Permalloy (NiFe) and having a thickness of approximately 3 μm, for example, is formed on the insulating layer 2 by a method such as sputtering or plating.

Next, a bottom shield gap film 4 made of an insulating material such as alumina and having a thickness of 10 to 200 nm, for example, is formed on the bottom shield layer 3 by a method such as sputtering. Next, an MR element 5 for reading, a pair of bias field applying layers not shown and a pair of electrode layers 6 each of which has a thickness of tens of nanometers are formed on the bottom shield gap film 4. Next, a top shield gap film 7 made of an insulating material such as alumina and having a thickness of 10 to 200 nm, for example, is formed on the bottom shield gap film 4 and the MR element 5 by a method such as sputtering.

Figure 16:
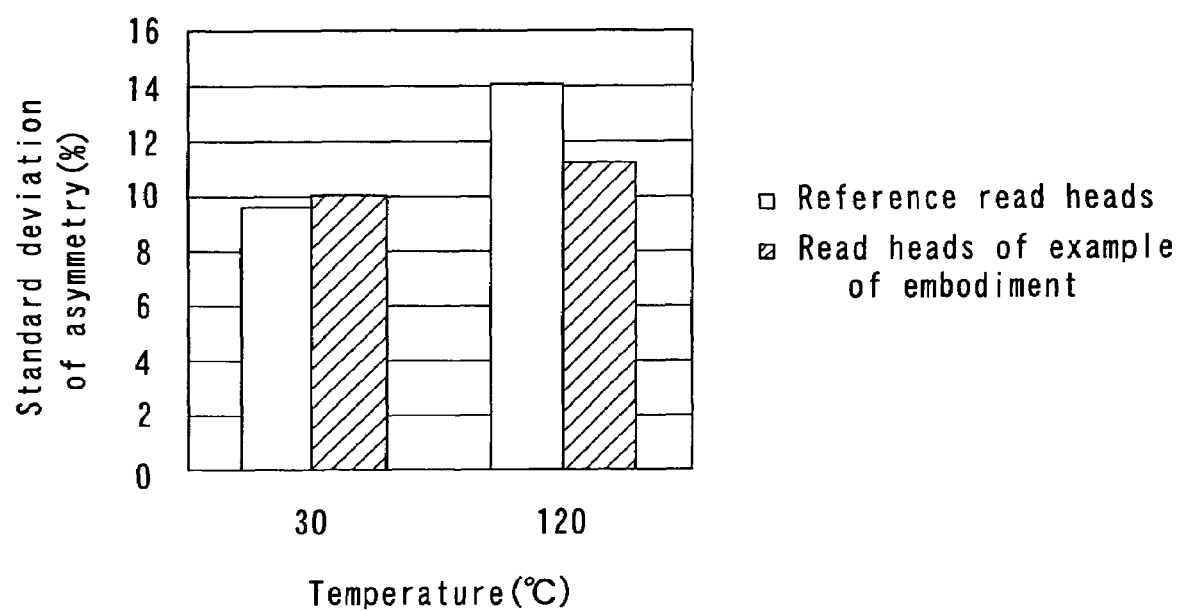
FIG. 16 is a plot showing the standard deviation of the asymmetry obtained from the measurement results shown in FIG. 12 to FIG. 15.
Figure 17:
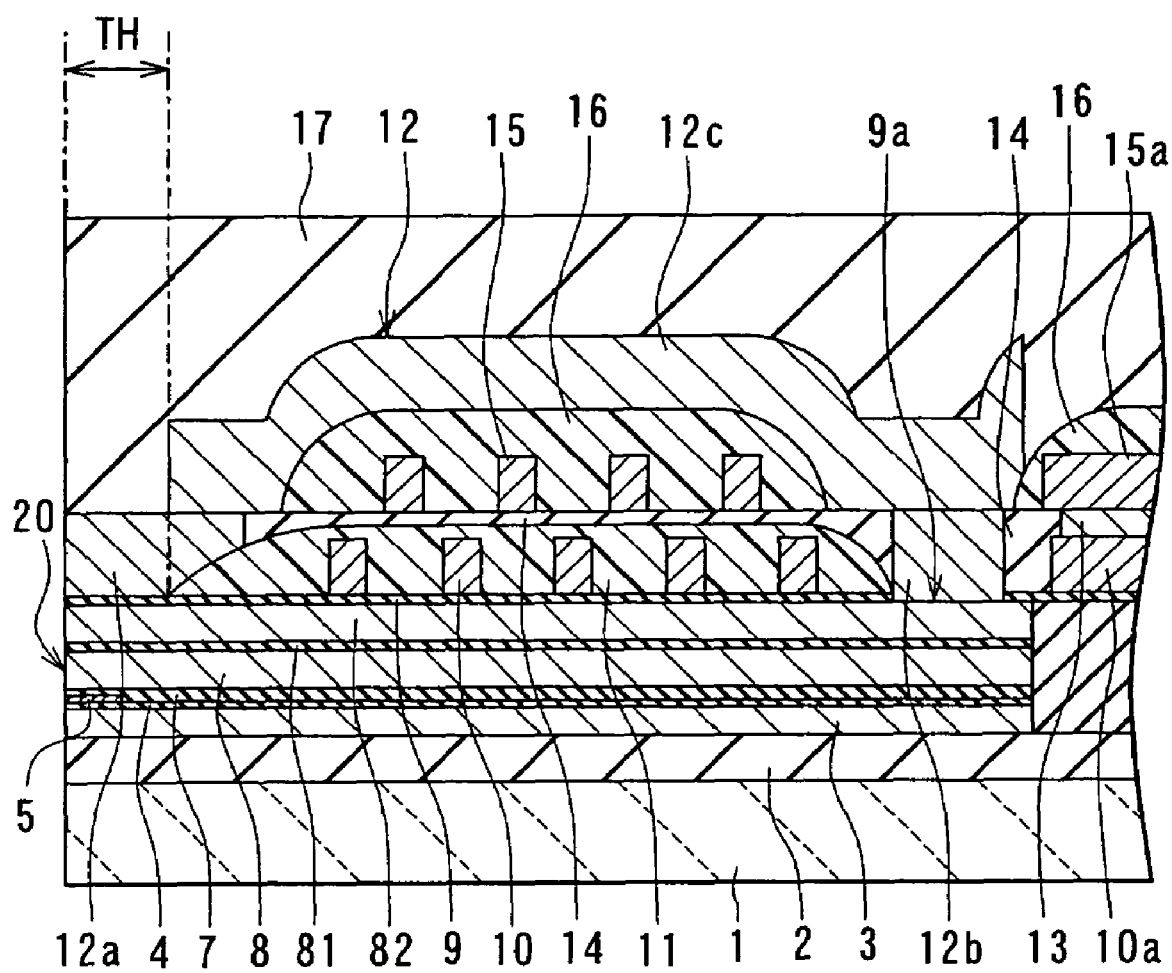
FIG. 17 is a cross-sectional view of a thin-film magnetic head of a modification example of the embodiment of the invention, wherein the cross section is orthogonal to the air bearing surface and the substrate.
Figure 18:
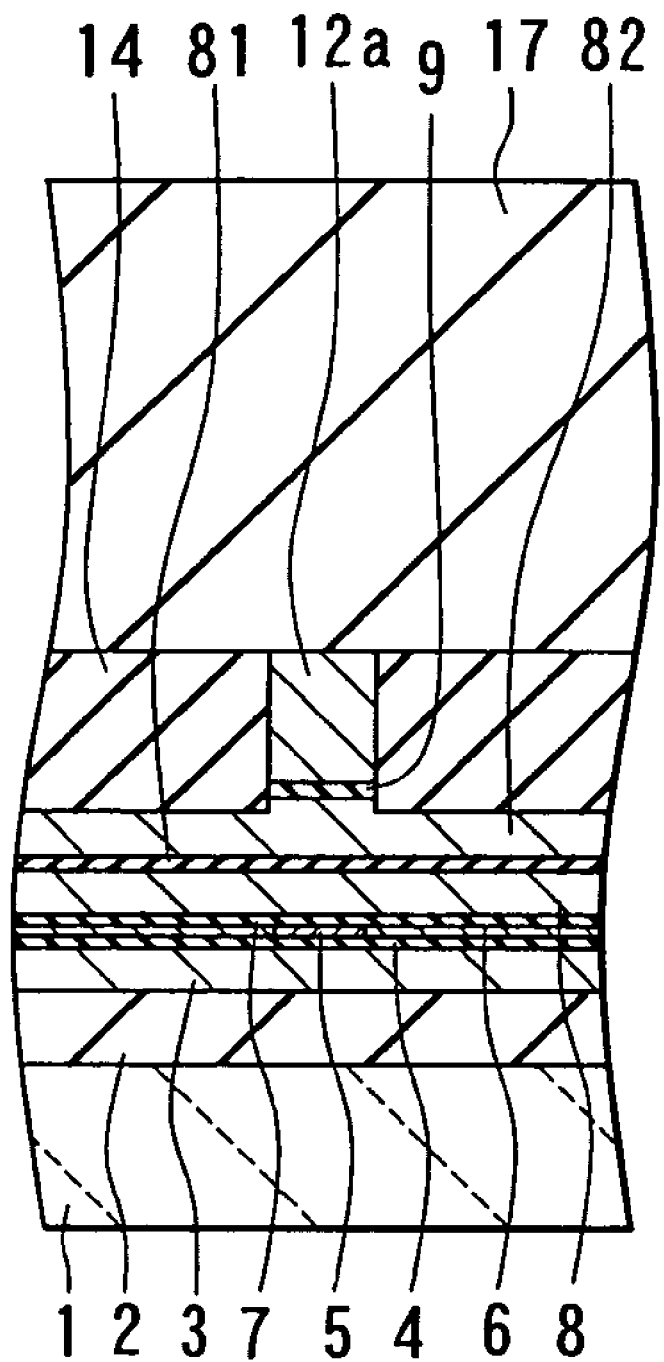
FIG. 18 is a cross-sectional view of the pole portion of the thin-film magnetic head of the modification example of the embodiment of the invention, wherein the cross section is parallel to the air bearing surface.

Next, a top shield layer 8 for the read head is formed on the top shield gap film 7. The top shield layer 8 is made of a magnetic material and has a thickness of 3 to 4 μm, for example, and also functions as a bottom pole layer of a write head. The top shield layer 8 is made of a soft magnetic material such as NiFe, CoFe, CoFeNi or FeN. The top shield layer 8 is formed by plating or sputtering, for example. Alternatively, as shown in FIG. 16 and FIG. 17, a top shield layer 8 that does not function as the bottom pole layer, a separating layer 81 and a bottom pole layer 82 may be provided in place of the top shield layer 8 that also functions as the bottom pole layer. The separating layer 81 is made of a nonmagnetic material such as alumina and formed by sputtering, for example, on the top shield layer 8 that does not function as the bottom pole layer. The bottom pole layer 82 is formed on the separating layer 81. The separating layer 81 may be a nonmagnetic conductive layer.

Next, a write gap layer 9 made of a nonmagnetic material such as alumina and having a thickness of 50 to 300 nm, for example, is formed on the top shield layer 8 (or the bottom pole layer 82) by a method such as sputtering. Next, to make a magnetic path, a portion of the write gap layer 9 is etched to form a contact hole 9a in a center portion of a thin-film coil described later.

Next, a first layer portion 10 of the thin-film coil made of copper (Cu), for example, and having a thickness of 2 to 3 μm, for example, is formed on the write gap layer 9. In FIG. 4 numeral 10a indicates a connecting portion of the first layer portion 10 connected to a second layer portion 15 of the thin-film coil described later. The first layer portion 10 is wound around the contact hole 9a.

Next, an insulating layer 11 having a specific pattern is formed to cover the first layer portion 10 of the thin-film coil and the write gap layer 9 disposed around the first layer portion 10. The insulating layer 11 is made of an organic insulating material that exhibits fluidity when heated, such as photoresist. Next, heat processing is performed at a specific temperature to flatten the surface of the insulating layer 11. Through this heat processing, each of the outer and inner edge portions of the insulating layer 11 is made to have a shape of rounded sloped surface.

Next, a track width defining layer 12a of a top pole layer 12 made of a magnetic material for the write head is formed on regions of the write gap layer 9 and the insulating layer 11, the regions extending from a sloped portion of the insulating layer 11 closer to an air bearing surface 20 described later toward the air bearing surface 20. The top pole layer 12 is made up of the track width defining layer 12a, and a coupling portion layer 12b and a yoke portion layer 12c that will be described later.

The track width defining layer 12a has: a tip portion that is formed on the write gap layer 9 and functions as the pole portion of the top pole layer 12; and a connecting portion that is formed on the sloped portion of the insulating layer 11 closer to the air bearing surface 20 and connected to the yoke portion layer 12c. The tip portion has a width equal to the write track width. The connecting portion has a width greater than that of the tip portion.

When the track width defining layer 12a is formed, the coupling portion layer 12b made of a magnetic material is formed in the contact hole 9a and a connecting layer 13 made of a magnetic material is formed on the connecting portion 10a at the same time. The coupling portion layer 12b makes up a portion of the top pole layer 12 that is magnetically coupled to the top shield layer 8 (or the bottom pole layer 82).

Next, pole trimming is performed. That is, in a region around the track width defining layer 12a, the write gap layer 9 and at least a portion of the pole portion of the top shield layer 8 (or the bottom pole layer 82) close to the write gap layer 9 are etched, using the track width defining layer 12a as a mask. As a result, as shown in FIG. 5, a trim structure is formed, wherein the pole portion of the top pole layer 12, the write gap layer 9 and at least a portion of the pole portion of the top shield layer 8 (or the bottom pole layer 82) have equal widths. The trim structure has an effect of preventing an increase in effective track width resulting from an expansion of magnetic flux near the write gap layer 9.

Next, an insulating layer 14 made of an inorganic insulating material such as alumina and having a thickness of 3 to 4 μm, for example, is formed over the entire surface. The insulating layer 14 is then polished by chemical mechanical polishing, for example, to reach the surfaces of the track width defining layer 12a, the coupling portion layer 12b and the connecting layer 13, and flattened.

Next, the second layer portion 15 of the thin-film coil made of copper (Cu), for example, and having a thickness of 2 to 3 μm, for example, is formed on the flattened insulating layer 14. In FIG. 4 numeral 15a indicates a connecting portion of the second layer portion 15 connected to the connecting portion 10a of the first layer portion 10 of the thin-film coil through the connecting layer 13. The second layer portion 15 is wound around the coupling portion layer 12b.

Next, an insulating layer 16 having a specific pattern is formed to cover the second layer portion 15 of the thin-film coil and the insulating layer 14 disposed around the second layer portion 15. The insulating layer 16 is made of an organic insulating material that exhibits fluidity when heated, such as photoresist. Next, heat processing is performed at a specific temperature to flatten the surface of the insulating layer 16. Through this heat processing, each of the outer and inner edge portions of the insulating layer 16 is made to have a shape of rounded sloped surface.

Next, the yoke portion layer 12c made of a magnetic material for the write head such as Permalloy is formed on the track width defining layer 12a, the insulating layers 14 and 16, and the coupling portion layer 12b. The yoke portion layer 12c makes up the yoke portion of the top pole layer 12. One of ends of the yoke portion layer 12c closer to the air bearing surface 20 is located at a distance from the air bearing surface 20. The yoke portion layer 12c is connected to the top shield layer 8 (or the bottom pole layer 82) through the coupling portion layer 12b.

Next, an overcoat layer 17 made of alumina, for example, is formed to cover the entire surface. Finally, machining of the slider including the foregoing layers is performed to form the air bearing surface 20 of the thin-film magnetic head including the write head and the read head. The thin-film magnetic head is thus completed. The machining of the slider includes polishing (lapping) of the air bearing surface 20.

The thin-film magnetic head thus manufactured comprises the air bearing surface 20 as the medium facing surface that faces toward a recording medium, the read head and the write head. The read head incorporates: the MR element 5 disposed near the air bearing surface 20; and the bottom shield layer 3 and the top shield layer 8 for shielding the MR element 5, wherein portions of the bottom shield layer 3 and the top shield layer 8 close to the air bearing surface 20 are opposed to each other with the MR element 5 disposed in between.

The write head incorporates the bottom pole layer (the top shield layer 8 or the bottom pole layer 82) and the top pole layer 12 that are magnetically coupled to each other and include the pole portions that are opposed to each other and placed in regions on a side of the air bearing surface 20. The write head further incorporates: the write gap layer 9 provided between the pole portion of the bottom pole layer and the pole portion of the top pole layer 12; and the thin-film coil including the portions 10 and 15 at least part of which is placed between the bottom pole layer and the top pole layer 12 and insulated from the bottom pole layer and the top pole layer 12. In the thin-film magnetic head, as shown in FIG. 4, throat height TH is the length from the air bearing surface 20 to the end of the insulating layer 11 closer to the air bearing surface 20. The throat height is the length (height) from the air bearing surface 20 to the point at which the distance between the two pole layers starts to increase.

Figure 1:
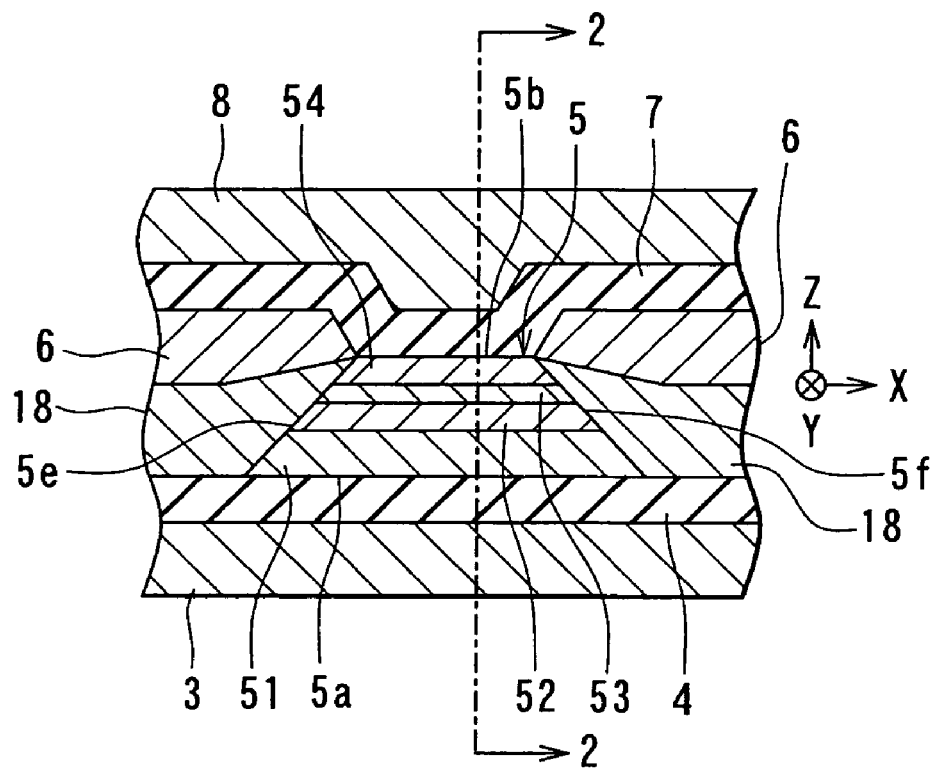
FIG. 1 is a cross-sectional view of a read head of an embodiment of the invention, wherein the cross section is parallel to the air bearing surface.
Figure 2:
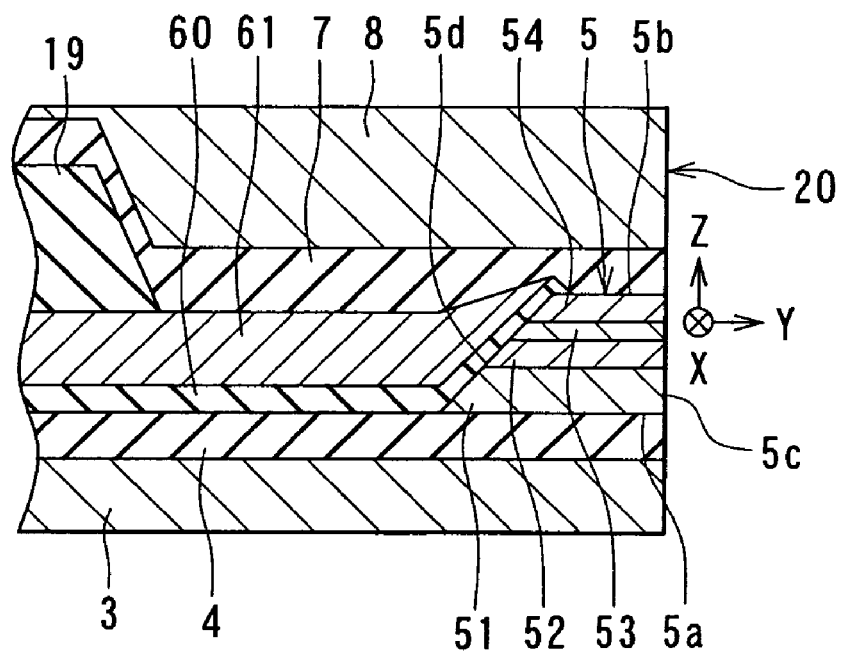
FIG. 2 is a cross-sectional view taken along line 2-2 of FIG. 1.
Figure 3:
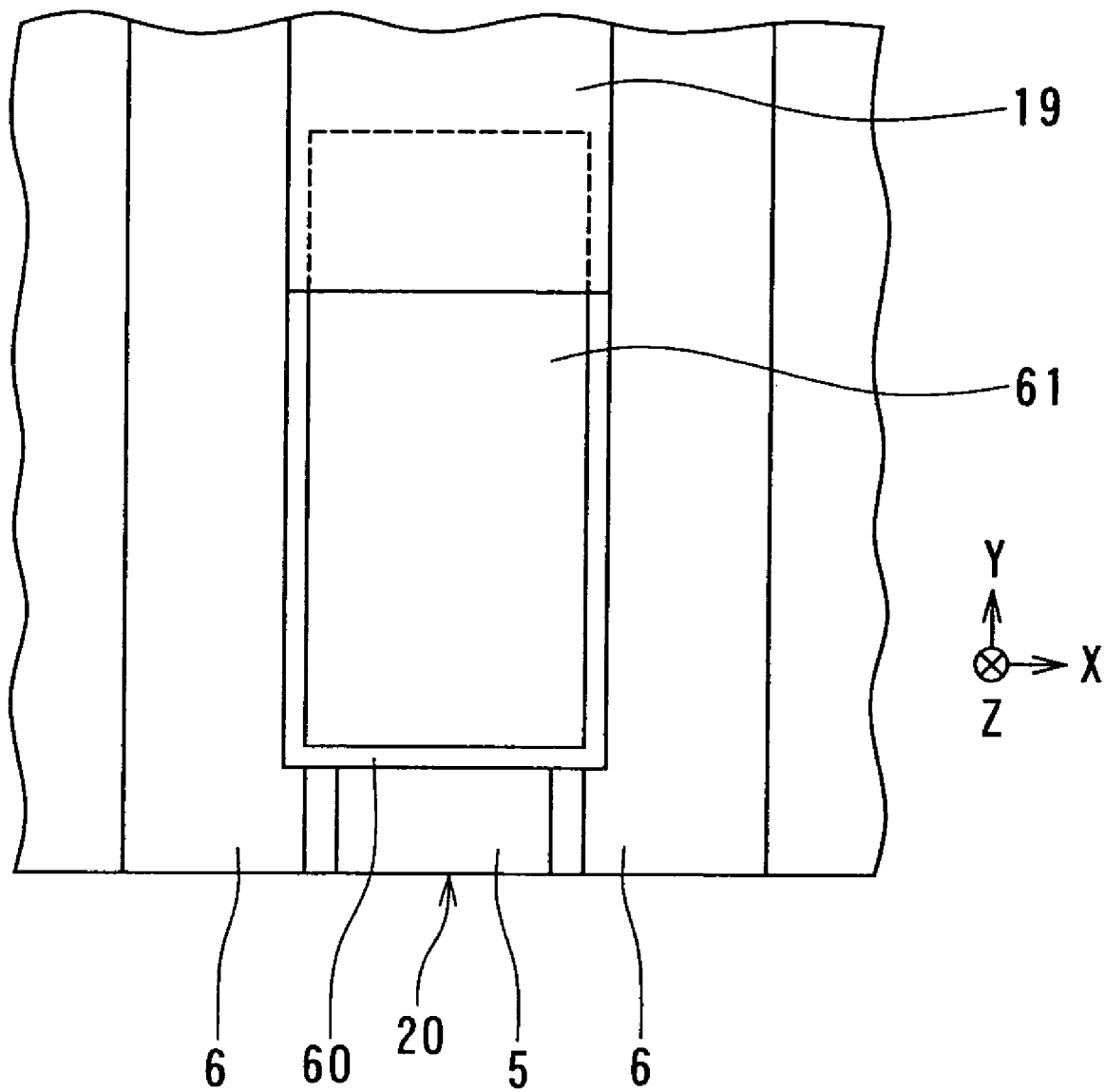
FIG. 3 is a top view illustrating a main part of the read head of the embodiment of the invention.

Reference is now made to FIG. 1 to FIG. 3 to describe details of the configuration of the read head of the embodiment. FIG. 1 is a cross-sectional view of the read head, wherein the cross section is parallel to the air bearing surface. FIG. 2 is a cross-sectional view taken along line 2-2 of FIG. 1. FIG. 3 is a top view illustrating the main part of the read head. In FIG. 1 to FIG. 3, an X direction is the direction of track width, that is, the direction parallel to the air bearing surface 20 and parallel to the surface of the MR element 5. A Y direction is the direction orthogonal to the air bearing surface 20. A Z direction is the direction orthogonal to the X direction and the Y direction.

The read head comprises: the bottom shield layer 3 and the top shield layer 8 disposed at a specific distance from each other; the MR element 5 disposed between the bottom shield layer 3 and the top shield layer 8; the bottom shield gap film 4 disposed between the bottom shield layer 3 and the MR element 5; and the top shield gap film 7 disposed between the top shield layer 8 and the MR element 5.

The MR element 5 has: a first surface (a bottom surface) 5a and a second surface (a top surface) 5b that face toward opposite directions and that are disposed to intersect the air bearing surface 20; a first end 5c located in the air bearing surface 20; a second end 5d located opposite to the first end 5c; and two side portions 5e and 5f. The first end 5c corresponds to the "first end closer to the medium facing surface" of the invention. The bottom shield gap film 4 is disposed adjacent to the first surface 5a of the MR element 5. The top shield gap film 7 is disposed adjacent to the second surface 5b of the MR element 5.

The end 5d is tilted such that the distance between the ends 5c and 5d decreases toward an upper portion of the MR element 5. The side portions 5e and 5f are tilted, too, such that the distance between the side portions 5e and 5f decreases toward the upper portion of the MR element 5.

The read head further comprises: the two bias field applying layers 18 that are disposed adjacent to the side portions 5e and 5f of the MR element 5 and apply a bias magnetic field to the MR element 5; and the two electrode layers 6 that are disposed adjacent to the top surfaces of the bias field applying layers 18 and feed a sense current for detecting signals to the MR element 5. Although the electrode layers 6 are disposed on top of the bias field applying layers 18 in FIG. 1, the electrode layers 6 are disposed on the bottom shield gap film 4 in a region in which the bias field applying layers 18 do not exist. The bias field applying layers 18 and the electrode layers 6 are disposed between the bottom shield gap film 4 and the top shield gap film 7. FIG. 3 illustrates the state in which the top shield gap film 7 and the top shield layer 8 are excluded.

The bias field applying layers 18 are each made of a hard magnetic layer (a hard magnet) or a layered structure made up of a ferromagnetic layer and an antiferromagnetic layer, for example. The electrode layers 6 are each made of a layered structure made up of a Ta layer and an Au layer, a layered structure made up of a TiW layer and a Ta layer, or a layered structure made up of a TiN layer and a Ta layer, for example.

The bias field applying layers 18 are magnetized such that the magnetization in the bias field applying layers 18 is directed to the direction of track width, and apply a bias magnetic field in the direction of track width to the MR element 5.

As shown in FIG. 2, the read head further comprises: an insulating film 60 that is disposed on the bottom shield gap film 4, such that a portion of the insulating film 60 is adjacent to the second end 5d of the MR element 5; and an adjacent layer 61 disposed on the insulating film 60. An insulating layer 19 made of an insulating material such as alumina is formed between the bottom shield gap film 4 and the top shield gap film 7 except the region in which the MR element 5 is disposed and part of the region around this region. The insulating layer 19 has a portion disposed on the adjacent layer 61.

The insulating film 60 is made of an insulating material such as alumina. The adjacent layer 61 is disposed adjacent to the second end 5d of the MR element 5 with the insulating film 60 disposed in between. The adjacent layer 61 is made of a metal material having a linear thermal expansion coefficient whose absolute value is $6 \times 10^{-6}/°$ C. or smaller at a temperature of 30° C. This absolute value is preferably $1 \times 10^{-6}/°$ C. or smaller.

The insulating film 60 has a thickness smaller than that of the MR element 5. Therefore, the distance between the second end 5d of the MR element 5 and the adjacent layer 61 is smaller than the thickness of the MR element 5. The thickness of the insulating film 60 is preferably 5 to 20 nm.

The metal material making up the adjacent layer 61 may include any of an iron-nickel alloy, an iron-platinum alloy, an iron-palladium alloy, an iron-cobalt-nickel alloy, an iron-cobalt-chromium alloy, an iron-nickel-chromium alloy, an iron-nickel-manganese alloy, and an antiferromagnetic chromium-iron-manganese alloy.

Various alloys as listed above include an Invar alloy and a kovar (the trade name) alloy. The Invar alloy includes an iron-nickel alloy containing 34 to 36 weight % nickel, and an iron-cobalt-nickel alloy containing approximately 34 to 36 weight % nickel and approximately 4 to 5 weight % cobalt. The iron-nickel alloy containing 34 to 36 weight % nickel has a linear thermal expansion coefficient of about $1 \times 10^{-6}/°$ C. to $2 \times 10^{-6}/°$ C. at a temperature of 30° C. The iron-cobalt-nickel alloy containing approximately 34 to 36 weight % nickel and approximately 4 to 5 weight % cobalt has a linear thermal expansion coefficient of about $0/°$ C. to $1 \times 10^{-6}/°$ C. at a temperature of 30° C. The kovar alloy is an iron-cobalt-nickel alloy containing approximately 29 weight % nickel and approximately 17 weight % cobalt, and has a linear thermal expansion coefficient of about $5 \times 10^{-6}/°$ C. at a temperature of 30° C. Any of the above-listed alloys may contain an additive in addition to the primary metals making up the alloy.

The MR element 5 incorporates: a nonmagnetic conductive layer 53 having two surfaces facing toward opposite directions; a free layer 54 disposed adjacent to one of the surfaces of the nonmagnetic conductive layer 53, wherein the magnetization in the free layer 54 changes in response to an external magnetic field; a pinned layer 52 disposed adjacent to the other of the surfaces of the nonmagnetic conductive layer 53, wherein the direction of magnetization in the pinned layer 52 is fixed to the direction orthogonal to the air bearing surface 20; and an antiferromagnetic layer 51 disposed adjacent to one of the surfaces of the pinned layer 52 farther from the nonmagnetic conductive layer 53. FIG. 1 illustrates an example in which the free layer 54 is disposed on the nonmagnetic conductive layer 53, and the pinned layer 52 and the antiferromagnetic layer 51 are disposed below the nonmagnetic conductive layer 53. However, the free layer 54 may be disposed below the nonmagnetic conductive layer 53, and the pinned layer 52 and the antiferromagnetic layer 51 may be disposed on the nonmagnetic conductive layer 53.

The MR element 5 is formed by forming films to be the layers 51, 52, 53 and 54 one by one, and patterning the layered structure made up of these films. The layered structure may be patterned by, for example, forming a mask on the layered structure by photolithography, and selectively etching the layered structure through dry etching such as ion milling through the use of the mask. The end 5d and the side portions 5e and 5f that are tilted are formed by this etching.

The nonmagnetic conductive layer 53 is made of a nonmagnetic conductive material such as Cu, Au or Ag. The free layer 54 includes one or more soft magnetic layers. The pinned layer 52 is a ferromagnetic layer in which the direction of magnetization is fixed. The antiferromagnetic layer 51 fixes the direction of magnetization in the pinned layer 52 by means of exchange coupling with the pinned layer 52. The direction of magnetization in the pinned layer 52 is fixed in the direction orthogonal to the air bearing surface 20.

The operation of the thin-film magnetic head of the embodiment will now be described. The thin-film magnetic head writes data on a recording medium by using the write head and reads data written on the recording medium by using the read head.

In the read head, when no external magnetic field is applied to the free layer 54, the direction of magnetization in the free layer 54 is directed to the direction X of track width by the bias magnetic field sent from the bias field applying layers 18. On the other hand, the direction of magnetization in the pinned layer 52 is fixed to the direction Y orthogonal to the air bearing surface 20. Consequently, when no signal magnetic field sent from the recording medium is applied to the free layer 54, an angle of 90 degrees is maintained between the direction of magnetization in the pinned layer 52 and the direction of magnetization in the free layer 54. If a signal field in the direction orthogonal to the air bearing surface 20 is sent from the recording medium and applied to the read head, the direction of magnetization in the free layer 54 is changed, and the angle between the direction of magnetization in the pinned layer 52 and the direction of magnetization in the free layer 54 is thereby changed. The electrical resistance of the MR element 5 is changed by this angle. Therefore, it is possible to read data stored on the medium by detecting the change in electrical resistance of the MR element 5. It is possible to obtain the electrical resistance of the MR element 5 from the potential difference between the two electrode layers 6 when a sense current is fed to the MR element 5.

In the embodiment, the adjacent layer 61 is adjacent to the second end 5d of the MR element 5 with the insulating film 60 disposed in between. The material making up the adjacent layer 61 has a linear thermal expansion coefficient whose absolute value is $6 \times 10^{-6}/°$ C. or smaller at a temperature of 30° C., and preferably $1 \times 10^{-6}/°$ C. or smaller. Therefore, according to the embodiment, the material making up the adjacent layer 61 has a small linear thermal expansion coefficient, so that the amount of expansion of the adjacent layer 61 is small when the thin-film magnetic head is actually operated. Consequently, the force of the adjacent layer 61 pressing the MR element 5 toward the air bearing surface 20 is small when the thin-film magnetic head is actually operated. As a result, changes in asymmetry of the output of the read head caused by changes in temperature are reduced, and variations in asymmetry of the output of the read head are reduced, too, during actual use of the read head.

In the embodiment, the adjacent layer 61 made of a metal material is adjacent to the second end 5d of the MR element 5 with the insulating film 60 disposed in between. Typically, the metal material that may be used for the adjacent layer 61 is softer than an inorganic insulating material. As a result, when polishing of the air bearing surface 20 is performed in the manufacturing process of the thin-film magnetic head, the stress applied to the MR element 5 is moderated by the adjacent layer 61. As a result, according to the embodiment, it is possible to prevent disadvantages caused by the stress applied to the MR element 5 when polishing of the air bearing surface 20 is performed, such as a change in direction of magnetization in the pinned layer 52 by the inverse magnetostrictive effect.

The result of experiment performed for confirming the effect of the embodiment will now be described. In the experiment, read heads of an example of the embodiment and reference read heads were fabricated. The configuration of each of the read heads of the example of the embodiment is the one illustrated in FIG. 1 to FIG. 3. The material of the adjacent layer 61 of the example was NiFe (36 weight % Ni and 64 weight % Fe). The material had a linear thermal expansion coefficient of $1\times10^{-6}/°$ C. at a temperature of 30° C.

Figure 10:
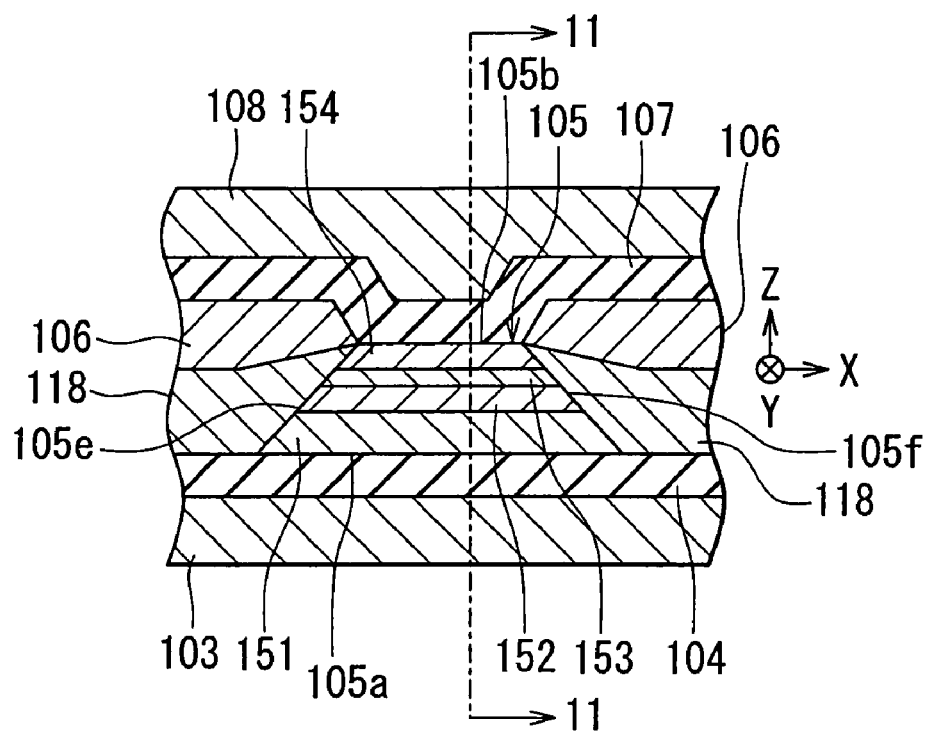
FIG. 10 is a cross-sectional view of a reference read head, wherein the cross section is parallel to the air bearing surface.
Figure 11:
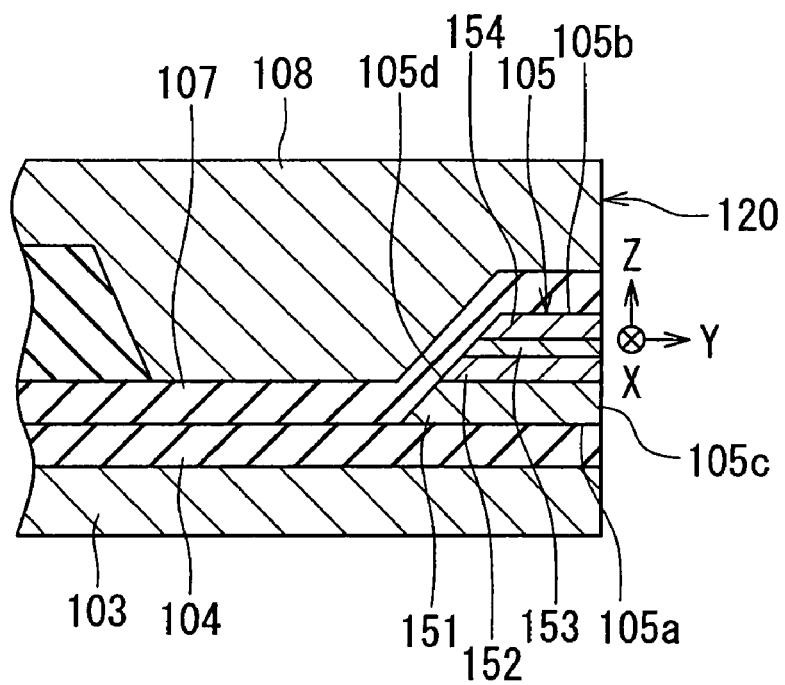
FIG. 11 is a cross-sectional view taken along line 11-11 of FIG. 10.

Reference is now made to FIG. 10 and FIG. 11 to describe the configuration of each of the reference read heads. FIG. 10 is a cross-sectional view of the reference read head, wherein the cross section is parallel to the air bearing surface. FIG. 11 is a cross-sectional view taken along line 11-11 of FIG. 10. The directions X, Y and Z are the same as those of FIG. 1 to FIG. 3.

The reference read head comprises: a bottom shield layer 103 and a top shield layer 108 disposed at a specific distance from each other; an MR element 105 disposed between the bottom shield layer 103 and the top shield layer 108; a bottom shield gap film 104 disposed between the bottom shield layer 103 and the MR element 105; and a top shield gap film 107 disposed between the top shield layer 108 and the MR element 105.

The MR element 105 has: a first surface (a bottom surface) 105a and a second surface (a top surface) 105b that face toward opposite directions and that are disposed to intersect an air bearing surface 120; a first end 105c located in the air bearing surface 120; a second end 105d located opposite to the first end 105c; and two side portions 105e and 105f. The bottom shield gap film 104 is disposed adjacent to the first surface 105a of the MR element 105. The top shield gap film 107 is disposed adjacent to the second surface 105b of the MR element 105.

The end 105d is tilted such that the distance between the ends 105c and 105d decreases toward an upper portion of the MR element 105. The side portions 105e and 105f are tilted, too, such that the distance between the side portions 105e and 105f decreases toward the upper portion of the MR element 105.

The reference read head further comprises: two bias field applying layers 118 that are disposed adjacent to the side portions 105e and 105f of the MR element 105 and apply a bias magnetic field to the MR element 105; and two electrode layers 106 that are disposed adjacent to the top surfaces of the bias field applying layers 118 and feed a sense current for detecting signals to the MR element 105. Although the electrode layers 106 are disposed on the bias field applying layers 118 in FIG. 10, the electrode layers 106 are disposed on the bottom shield gap film 104 in a region in which the bias field applying layers 118 do not exist. The bias field applying layers 118 and the electrode layers 106 are disposed between the bottom shield gap film 104 and the top shield gap film 107. The bias field applying layers 118 are magnetized such that the magnetization in the bias field applying layers 118 is directed to the direction of track width, and apply a bias magnetic field in the direction of track width to the MR element 105.

The MR element 105 incorporates: a nonmagnetic conductive layer 153 having two surfaces facing toward opposite directions; a free layer 154 disposed adjacent to one of the surfaces of the nonmagnetic conductive layer 153, wherein the magnetization in the free layer 154 changes in response to an external magnetic field; a pinned layer 152 disposed adjacent to the other of the surfaces of the nonmagnetic conductive layer 153, wherein the direction of magnetization in the pinned layer 152 is fixed to the direction orthogonal to the air bearing surface 120; and an antiferromagnetic layer 151 disposed adjacent to one of the surfaces of the pinned layer 152 farther from the nonmagnetic conductive layer 153. The antiferromagnetic layer 151 fixes the direction of magnetization in the pinned layer 152 by means of exchange coupling with the pinned layer 152. The direction of magnetization in the pinned layer 152 is fixed in the direction orthogonal to the air bearing surface 120.

In the reference read head, as shown in FIG. 11, the top shield layer 108 is adjacent to the second end 105d of the MR element 105 with the top shield gap film 107 disposed in between. The material making up the top shield layer 108 is NiFe (80 weight % Ni and 20 weight % Fe). This material has a linear thermal expansion coefficient of $12\times10^{-6}/°$ C. at a temperature of 30° C.

A plurality of read heads of the example of the embodiment and reference read heads were fabricated through the use of a respective single wafer at the same time. In the experiment, a quasi-static test was performed on the read heads of the example of the embodiment and the reference read heads thus fabricated, so as to measure the asymmetry of the read heads. To be specific, the asymmetry of the read heads was obtained by using the equation below where the amounts of change in resistance of each of the heads were $\Delta R(+H)$ and $\Delta R(-H)$, respectively, when magnetic fields of +H and −H were applied to the head in the direction orthogonal to the medium facing surface of the head. The value of H was 500 Oe (500× 79.6 A/m).

$$100\times\{\Delta R(+H)-\Delta R(-H)\}/\{\Delta R(+H)+\Delta R(-H)\}(\%)$$

The measurements of asymmetry of the read heads were performed in environments at a temperature of 30° C. and at a temperature of 120° C.

Figure 12:
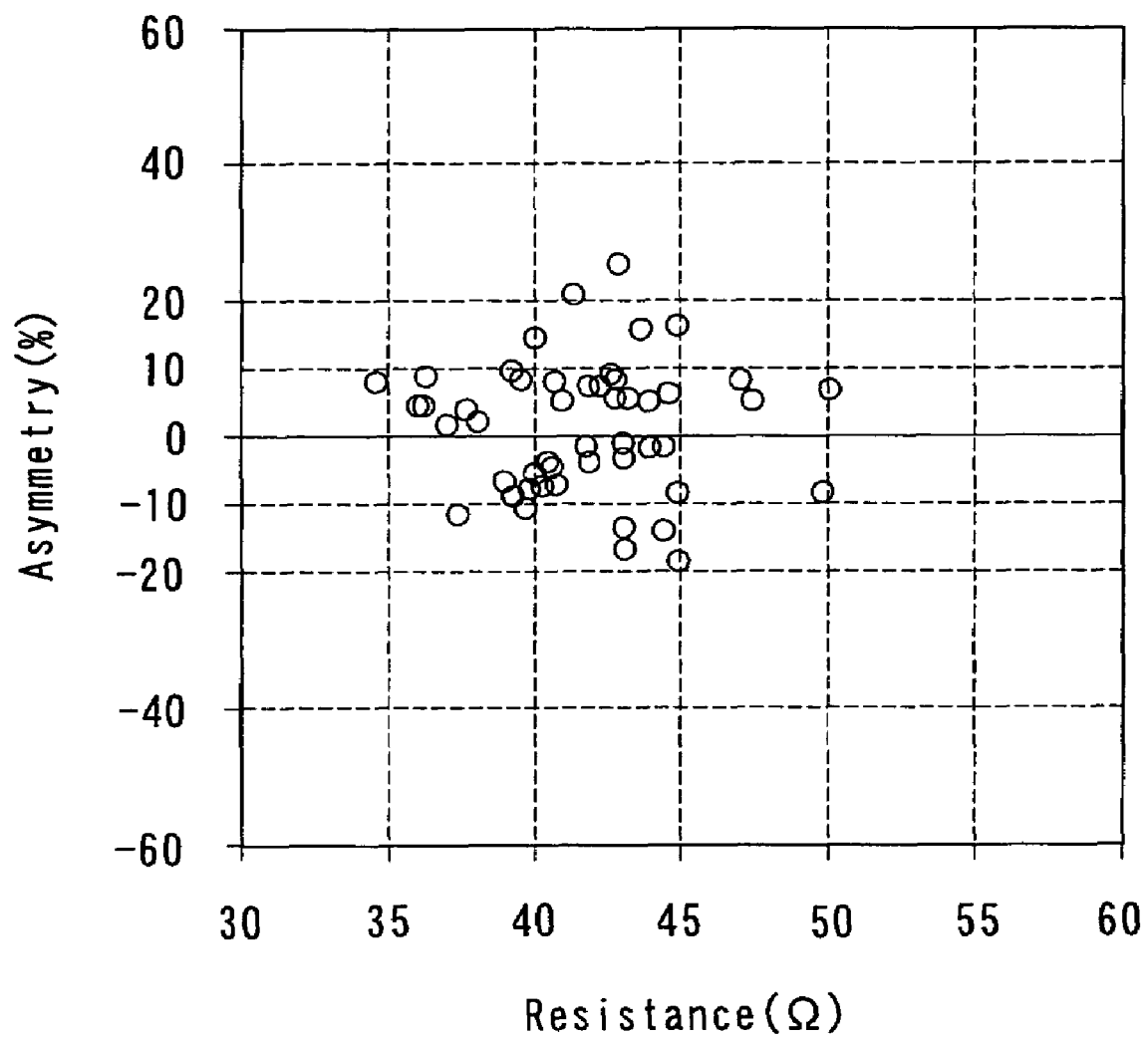
FIG. 12 is a plot showing the relationship between the resistance of the MR element and the asymmetry measured in an environment at a temperature of 30° C. for the reference read heads.

FIG. 12 shows the relationship between the resistance of the MR element 105 and the asymmetry measured in an environment at a temperature of 30° C. for the plurality of reference read heads. The standard deviation of the asymmetry that indicates variations in asymmetry according to the result of the measurement was 9.7%.

Figure 13:
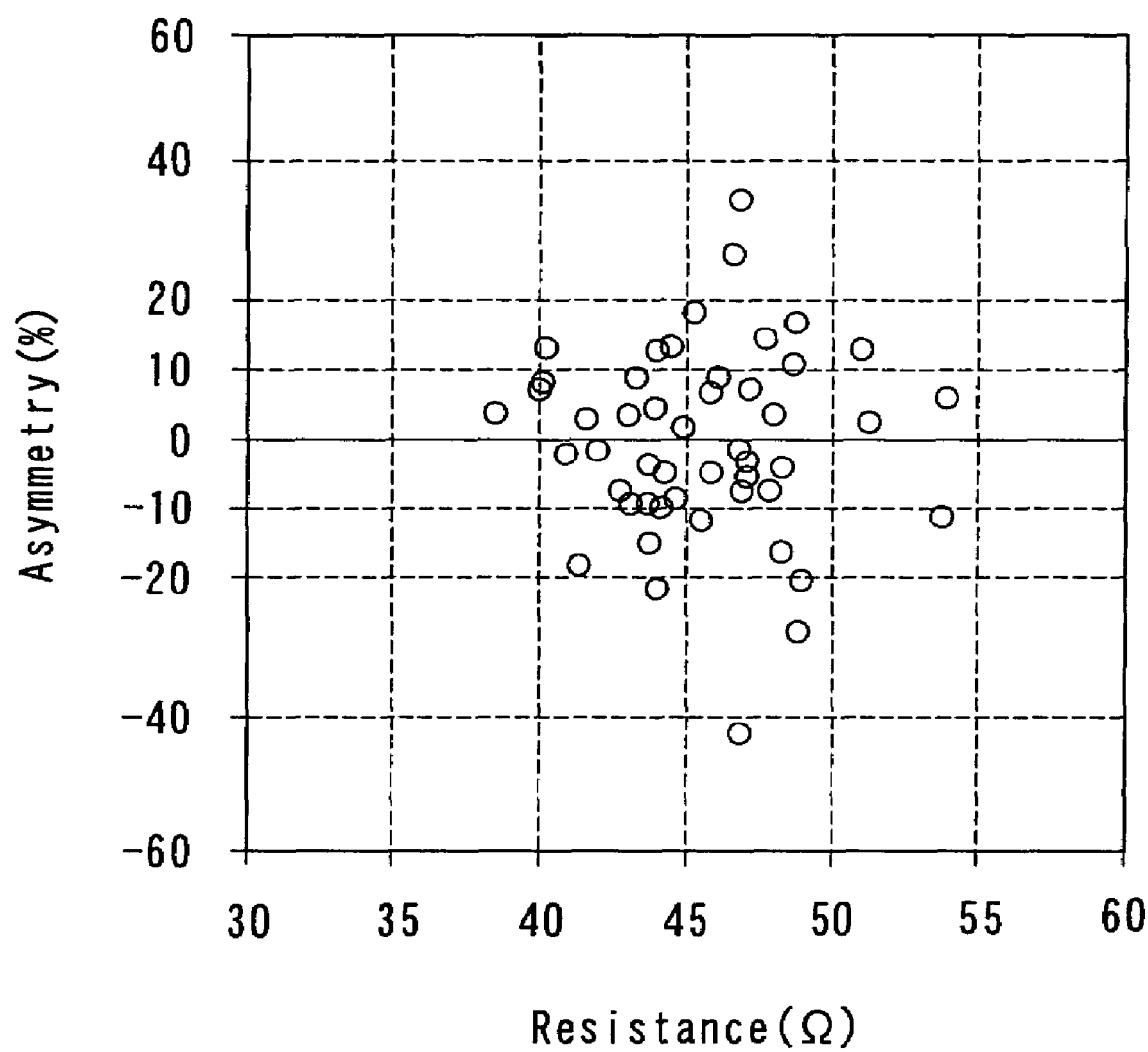
FIG. 13 is a plot showing the relationship between the resistance of the MR element and the asymmetry measured in an environment at a temperature of 120° C. for the reference read heads.

FIG. 13 shows the relationship between the resistance of the MR element 105 and the asymmetry measured in an environment at a temperature of 120° C. for the plurality of reference read heads. The standard deviation of the asymmetry that indicates variations in asymmetry according to the result of the measurement was 14.0%.

Figure 14:
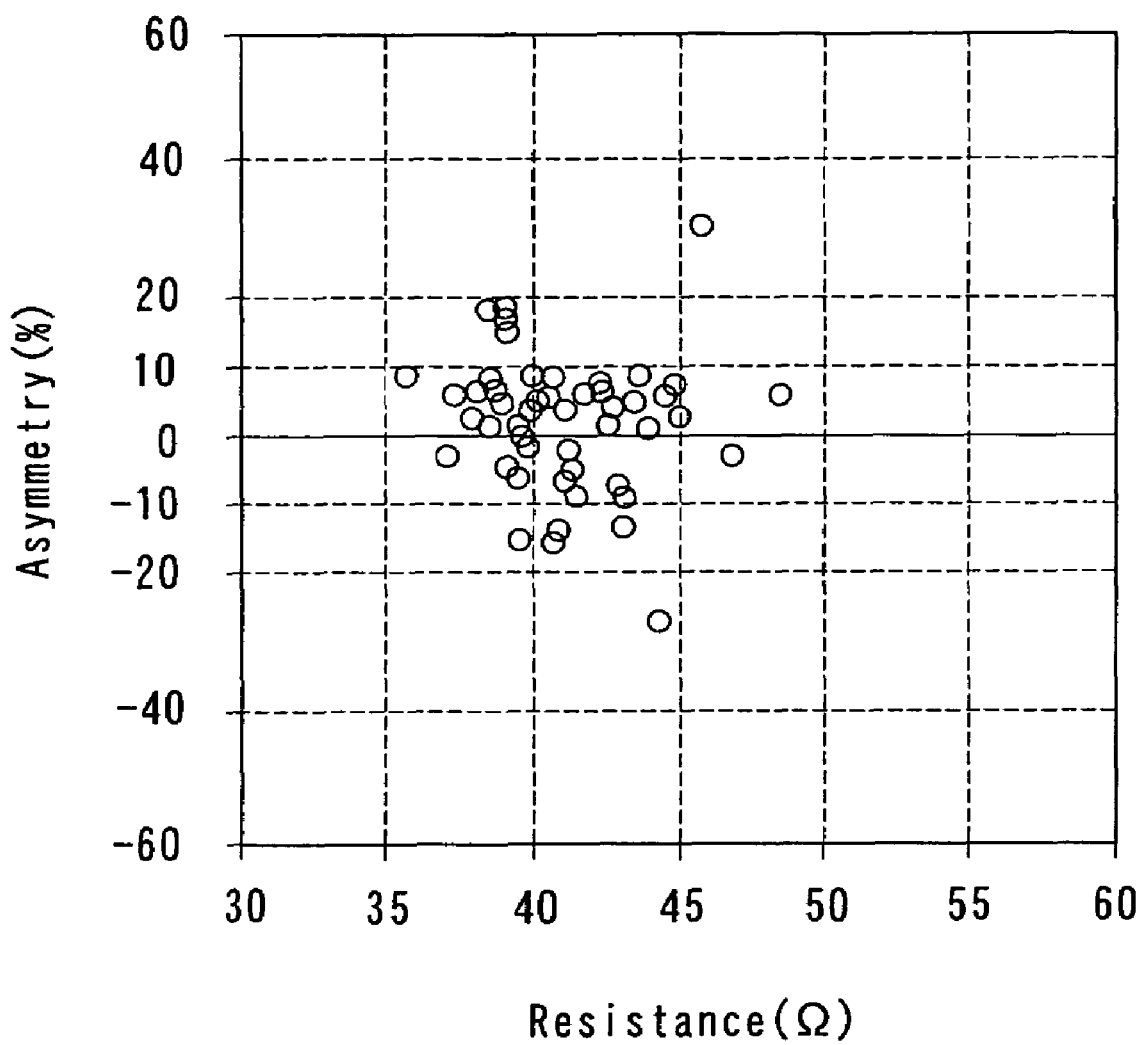
FIG. 14 is a plot showing the relationship between the resistance of the MR element and the asymmetry measured in an environment at a temperature of 30° C. for the read heads of an example of the embodiment.

FIG. 14 shows the relationship between the resistance of the MR element 5 and the asymmetry measured in an environment at a temperature of 30° C. for the plurality of read heads of the example of the embodiment. The standard deviation of the asymmetry that indicates variations in asymmetry according to the result of the measurement was 10.1%.

Figure 15:
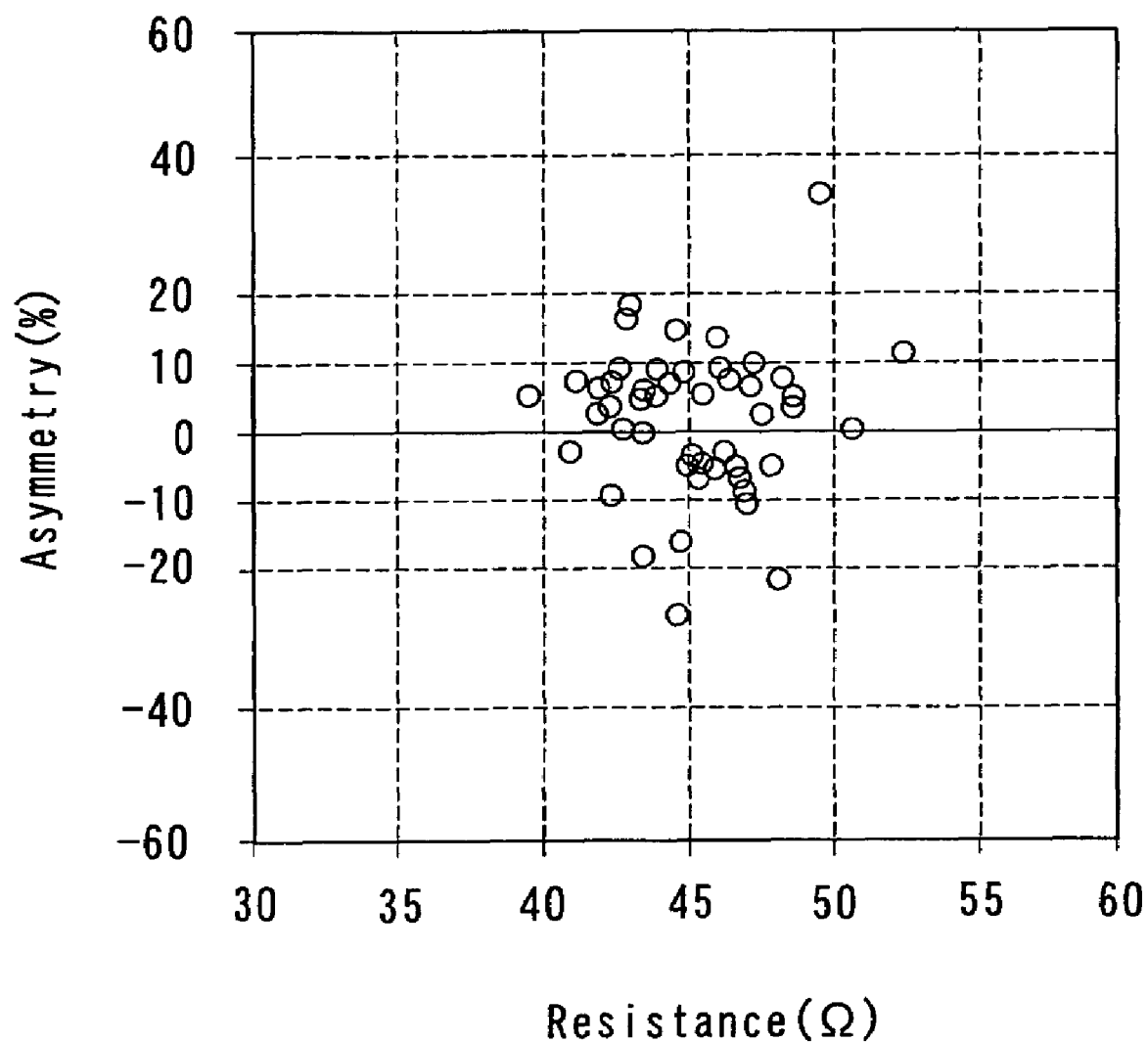
FIG. 15 is a plot showing the relationship between the resistance of the MR element and the asymmetry measured in an environment at a temperature of 120° C. for the read heads of the example of the embodiment.

FIG. 15 shows the relationship between the resistance of the MR element 5 and the asymmetry measured in an environment at a temperature of 120° C. for the plurality of read heads of the example of the embodiment. The standard deviation of the asymmetry that indicates variations in asymmetry according to the result of the measurement was 11.1%.

FIG. 16 shows the standard deviation of the asymmetry obtained from the measurement results shown in FIG. 12 to FIG. 15. For the reference read heads, as shown in FIG. 16, the standard deviation of the asymmetry greatly changed from 9.7% to 14.0% when the environmental temperature changed from 30° C. to 120° C. close to the temperature at which the thin-film magnetic heads are actually operated. This finding indicates that variations in asymmetry of the reference read heads greatly increase with a rise in temperature.

On the other hand, for the read heads of the example of the embodiment, the standard deviation of the asymmetry changed from 10.1% to 11.1% only by 1% when the environmental temperature changed from 30° C. to 120° C. This finding indicates that the read heads of the example of the embodiment are capable of suppressing an increase in variations in asymmetry of the heads caused by a rise in temperature.

Figure 6:
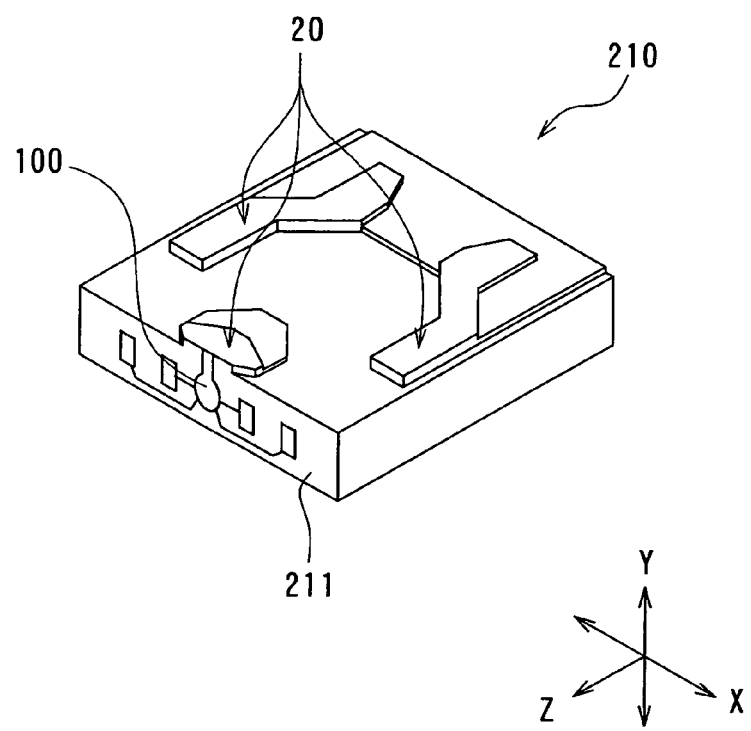
FIG. 6 is a perspective view illustrating a slider incorporated in a head gimbal assembly of the embodiment of the invention.

A head gimbal assembly and a hard disk drive of the embodiment will now be described. Reference is made to FIG. 6 to describe a slider 210 incorporated in the head gimbal assembly. In the hard disk drive, the slider 210 is placed to face toward a hard disk platter that is a circular-plate-shaped recording medium to be rotated and driven. The slider 210 has a base body 211 made up mainly of the substrate 1 and the overcoat layer 17 of FIG. 4. The base body 211 is nearly hexahedron-shaped. One of the six surfaces of the base body 211 faces toward the hard disk platter. The air bearing surface 20 is formed in this one of the surfaces. When the hard disk platter rotates in the Z direction of FIG. 6, an airflow passes between the hard disk platter and the slider 210 and a lift is thereby generated below the slider 210 in the Y direction of FIG. 6 and exerted on the slider 210. The slider 210 flies over the hard disk platter by means of the lift. The X direction of FIG. 6 is across the tracks of the hard disk platter. A thin-film magnetic head 100 of the embodiment is formed near the air-outflow-side end (the end located at the lower left of FIG. 6) of the slider 210.

Figure 7:
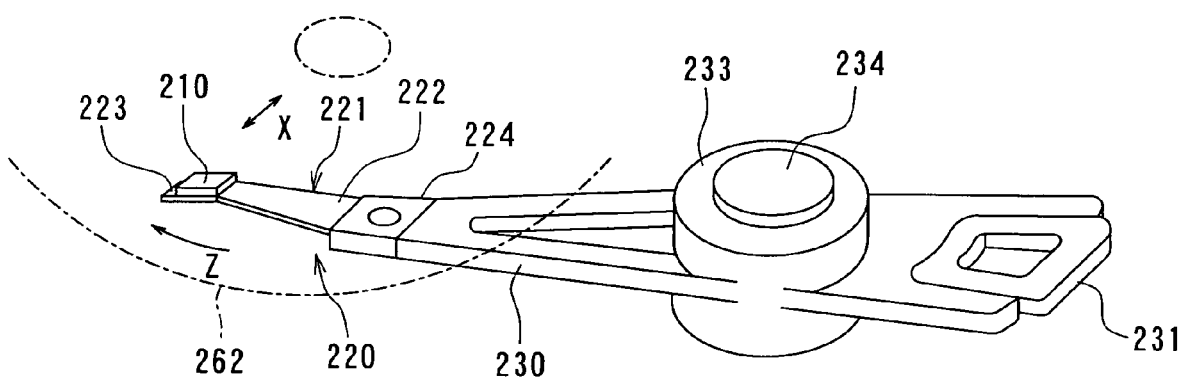
FIG. 7 is a perspective view illustrating a head arm assembly including the head gimbal assembly of the embodiment of the invention.

Reference is now made to FIG. 7 to describe the head gimbal assembly 220 of the embodiment. The head gimbal assembly 220 comprises the slider 210 and a suspension 221 that flexibly supports the slider 210. The suspension 221 incorporates: a plate-spring-shaped load beam 222 made of stainless steel, for example; a flexure 223 to which the slider 210 is joined, the flexure being located at an end of the load beam 222 and giving an appropriate degree of freedom to the slider 210; and a base plate 224 located at the other end of the load beam 222. The base plate 224 is attached to an arm 230 of an actuator for moving the slider 210 along the X direction across the tracks of the hard disk platter 262. The actuator incorporates the arm 230 and a voice coil motor that drives the arm 230. A gimbal section for maintaining the orientation of the slider 210 is provided in the portion of the flexure 223 on which the slider 210 is mounted.

The head gimbal assembly 220 is attached to the arm 230 of the actuator. An assembled body comprising the arm 230 and the head gimbal assembly 220 attached to the arm 230 is called a head arm assembly. An assembled body comprising a carriage having a plurality of arms wherein the head gimbal assembly 220 is attached to each of the arms is called a head stack assembly.

FIG. 7 illustrates an example of the head arm assembly. In the head arm assembly, the head gimbal assembly 220 is attached to an end of the arm 230. A coil 231 that is part of the voice coil motor is fixed to the other end of the arm 230. A bearing 233 is provided in the middle of the arm 230. The bearing 233 is attached to an axis 234 that rotatably supports the arm 230.

Figure 8:
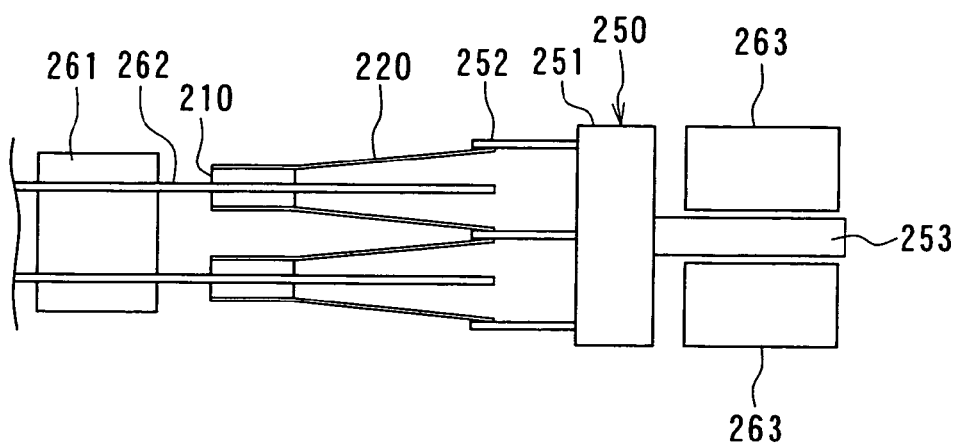
FIG. 8 is a view for illustrating a main part of a hard disk drive of the embodiment of the invention.
Figure 9:
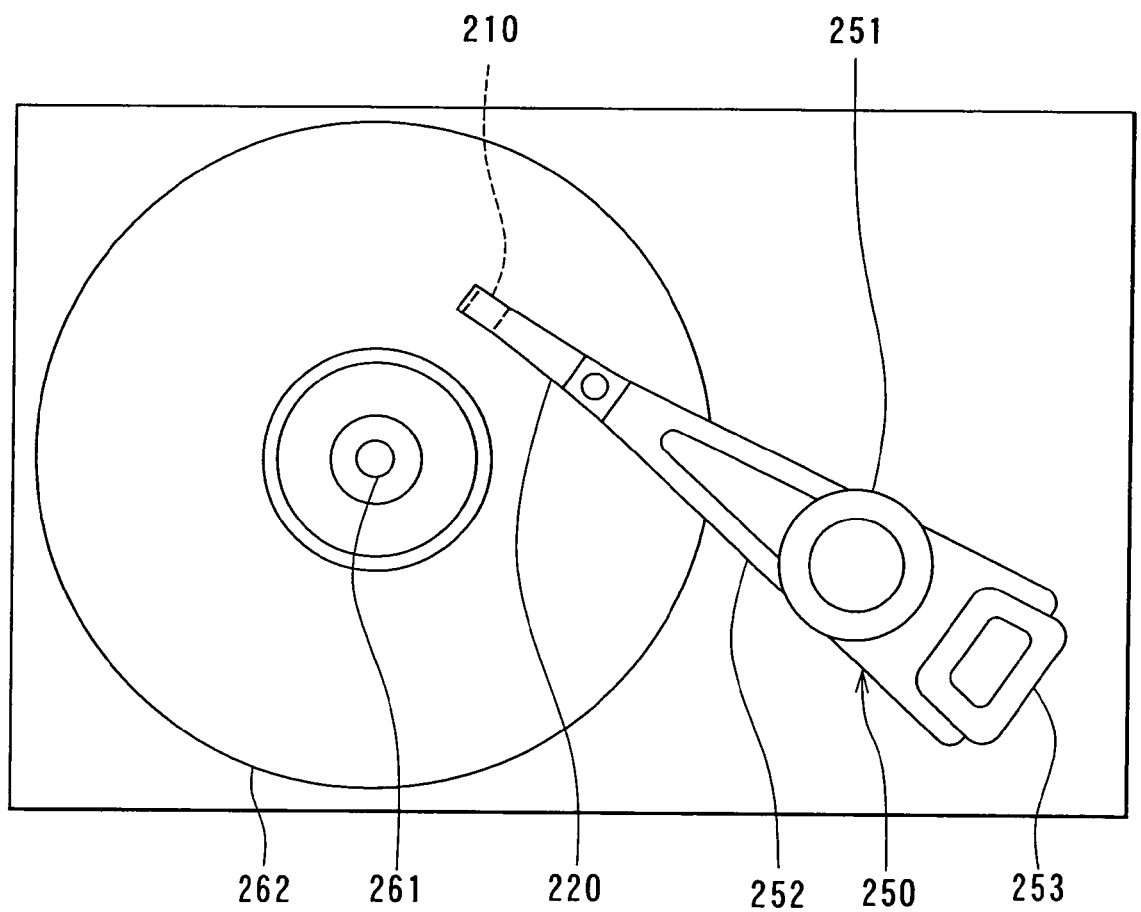
FIG. 9 is a top view of the hard disk drive of the embodiment of the invention.

Reference is now made to FIG. 8 and FIG. 9 to describe an example of the head stack assembly and the hard disk drive of the embodiment. FIG. 8 illustrates the main part of the hard disk drive. FIG. 9 is a top view of the hard disk drive. The head stack assembly 250 incorporates a carriage 251 having a plurality of arms 252. A plurality of head gimbal assemblies 220 are attached to the arms 252 such that the assemblies 220 are arranged in the vertical direction with spacing between adjacent ones. A coil 253 that is part of the voice coil motor is mounted on the carriage 251 on a side opposite to the arms 252. The head stack assembly 250 is installed in the hard disk drive. The hard disk drive includes a plurality of hard disk platters 262 mounted on a spindle motor 261. Two of the sliders 210 are allocated to each of the platters 262, such that the two sliders 210 are opposed to each other with each of the platters 262 disposed in between. The voice coil motor includes permanent magnets 263 disposed to be opposed to each other, the coil 253 of the head stack assembly 250 being placed between the magnets 263.

The actuator and the head stack assembly 250 except the sliders 210 correspond to the alignment device of the invention and support the sliders 210 and align them with respect to the hard disk platters 262.

In the hard disk drive of the embodiment, the actuator moves the slider 210 across the tracks of the hard disk platter 262 and aligns the slider 210 with respect to the hard disk platter 262. The thin-film magnetic head incorporated in the slider 210 writes data on the hard disk platter 262 through the use of the write head and reads data stored on the hard disk platter 262 through the use of the read head.

The head gimbal assembly and the hard disk drive of the embodiment exhibit effects similar to those of the foregoing thin-film magnetic head of the embodiment.

The present invention is not limited to the foregoing embodiment but may be practiced in still other ways. For example, the invention is not limited to thin-film magnetic heads incorporating spin-valve GMR elements as magnetoresistive elements, but may be applied to thin-film magnetic heads in general incorporating various types of magnetoresistive elements.

In the invention, the material making up the adjacent layer may have a negative linear thermal expansion coefficient at a temperature of 30° C.

In the foregoing embodiment, the thin-film magnetic head is disclosed, comprising the read head formed on the base body and the write head stacked on the read head. Alternatively, the read head may be stacked on the write head.

The thin-film magnetic head may have a configuration comprising the read head only if the thin-film magnetic head is dedicated to reading.

Obviously many modifications and variations of the present invention are possible in the light of the above teachings. It is therefore to be understood that within the scope of the appended claims the invention may be practiced otherwise than as specifically described.

What is claimed is:

1. A thin-film magnetic head comprising:
    a medium facing surface that faces toward a recording medium; and
    a magnetoresistive element disposed near the medium facing surface, wherein the magnetoresistive element has a first end located in the medium facing surface, and a second end opposite to the first end, the thin-film magnetic head further comprising:
    an insulating film disposed adjacent to the second end; and
    an adjacent layer disposed adjacent to the insulating film, the adjacent layer being made of a metal material having a linear thermal expansion coefficient whose absolute value is $1 \times 10^{-6}/°$ C. or smaller at a temperature of 30° C., wherein
    the insulating film includes a portion located between the second end and the adjacent layer; and the magnetoresistive element, the portion of the insulating film located between the second end and the adjacent layer, and the adjacent layer are aligned in this order in a direction perpendicular to the medium facing surface.

2. A thin-film magnetic head comprising:

a medium facing surface that faces toward a recording medium; and a magnetoresistive element disposed near the medium facing surface, wherein the magnetoresistive element has a first end located in the medium facing surface, and a second end opposite to the first end, the thin-film magnetic head further comprising:

an insulating film disposed adjacent to the second end; and an adjacent layer disposed adjacent to the insulating film, the adjacent layer being made of a metal material having a linear thermal expansion coefficient whose absolute value is $6 \times 10^{-6}/°$ C. or smaller at a temperature of 30° C., wherein:

the insulating film includes a portion located between the second end and the adjacent layer;

the magnetoresistive element, the portion of the insulating film located between the second end and the adjacent layer, and the adjacent layer are aligned in this order in a direction perpendicular to the medium facing surface; and the metal material making up the adjacent layer contains one of an iron-nickel alloy and an iron-cobalt-nickel alloy.

3. A head gimbal assembly comprising:

a slider incorporating a thin-film magnetic head and disposed to face toward a recording medium; and a suspension flexibly supporting the slider, the thin-film magnetic head comprising:

a medium facing surface that faces toward the recording medium; and a magnetoresistive element disposed near the medium facing surface, wherein the magnetoresistive element has a first end located in the medium facing surface, and a second end opposite to the first end, the thin-film magnetic head further comprising:

an insulating film disposed adjacent to the second end; and an adjacent layer disposed adjacent to the insulating film, the adjacent layer being made of a metal material having a linear thermal expansion coefficient whose absolute value is $1 \times 10^{-6}/°$ C. or smaller at a temperature of 30° C., wherein the insulating film includes a portion located between the second end and the adjacent layer; and the magnetoresistive element, the portion of the insulating film located between the second end and the adjacent layer, and the adjacent layer are aligned in this order in a direction perpendicular to the medium facing surface.

4. A hard disk drive comprising:

a slider incorporating a thin-film magnetic head and disposed to face toward a circular-plate-shaped recording medium that is rotated and driven; and an alignment device supporting the slider and aligning the slider with respect to the recording medium, the thin-film magnetic head comprising:

a medium facing surface that faces toward the recording medium; and a magnetoresistive element disposed near the medium facing surface, wherein the magnetoresistive element has a first end located in the medium facing surface, and a second end opposite to the first end, the thin-film magnetic head further comprising:

an insulating film disposed adjacent to the second end; and an adjacent layer disposed adjacent to the insulating film, the adjacent layer being made of a metal material having a linear thermal expansion coefficient whose absolute value is $1 \times 10^{-6}/°$ C. or smaller at a temperature of 30° C., wherein the insulating film includes a portion located between the second end and the adjacent layer; and the magnetoresistive element, the portion of the insulating film located between the second end and the adjacent layer, and the adjacent layer are aligned in this order in a direction perpendicular to the medium facing surface.

5. A head gimbal assembly comprising:

a slider incorporating a thin-film magnetic head and disposed to face toward a recording medium; and a suspension flexibly supporting the slider, the thin-film magnetic head comprising:

a medium facing surface that faces toward the recording medium; and a magnetoresistive element disposed near the medium facing surface, wherein the magnetoresistive element has a first end located in the medium facing surface, and a second end opposite to the first end, the thin-film magnetic head further comprising:

an insulating film disposed adjacent to the second end; and an adjacent layer disposed adjacent to the insulating film, the adjacent layer being made of a metal material having a linear thermal expansion coefficient whose absolute value is $6 \times 10^{-6}/°$ C. or smaller at a temperature of 30° C., wherein:

the insulating film includes a portion located between the second end and the adjacent layer;

the magnetoresistive element, the portion of the insulating film located between the second end and the adjacent layer, and the adjacent layer are aligned in this order in a direction perpendicular to the medium facing surface; and the metal material making up the adjacent layer contains one of an iron-nickel alloy and an iron-cobalt-nickel alloy.

6. A hard disk drive comprising:

a slider incorporating a thin-film magnetic head and disposed to face toward a circular-plate-shaped recording medium that is rotated and driven; and an alignment device supporting the slider and aligning the slider with respect to the recording medium, the thin-film magnetic head comprising:

a medium facing surface that faces toward the recording medium; and a magnetoresistive element disposed near the medium facing surface, wherein the magnetoresistive element has a first end located in the medium facing surface, and a second end opposite to the first end, the thin-film magnetic head further comprising:

an insulating film disposed adjacent to the second end; and an adjacent layer disposed adjacent to the insulating film, the adjacent layer being made of a metal material having a linear thermal expansion coefficient whose absolute value is $6\times10^{-6}/°$ C. or smaller at a temperature of 30° C., wherein:

the insulating film includes a portion located between the second end and the adjacent layer;

the magnetoresistive element, the portion of the insulating film located between the second end and the adjacent layer, and the adjacent layer are aligned in this order in a direction perpendicular to the medium facing surface; and the metal material making up the adjacent layer contains one of an iron-nickel alloy and an iron-cobalt-nickel alloy.

* * * * *